(12) United States Patent
Bueno et al.

(10) Patent No.: US 7,720,099 B2
(45) Date of Patent: May 18, 2010

(54) COMMON PROTOCOL AND ROUTING SCHEME FOR SPACE DATA PROCESSING NETWORKS

(75) Inventors: David R. Bueno, Pinellas Park, FL (US); Clifford E. Kimmery, Clearwater, FL (US)

(73) Assignee: Honeywell International Inc., Morristown, NJ (US)

(*) Notice: Subject to any disclaimer, the term of this patent is extended or adjusted under 35 U.S.C. 154(b) by 323 days.

(21) Appl. No.: 11/838,013

(22) Filed: Aug. 13, 2007

(65) Prior Publication Data
US 2009/0046709 A1   Feb. 19, 2009

(51) Int. Cl.
*H04J 3/16* (2006.01)
(52) U.S. Cl. .................. 370/469; 370/464; 370/465
(58) Field of Classification Search .......... 370/479, 370/471, 229, 473, 464, 465, 469
See application file for complete search history.

(56) References Cited

U.S. PATENT DOCUMENTS

| | | | |
|---|---|---|---|
| 5,446,736 A * | 8/1995 | Gleeson et al. ............ 370/473 |
| 5,627,829 A * | 5/1997 | Gleeson et al. ............ 370/230 |
| 6,331,986 B1 | 12/2001 | Mitra et al. |
| 6,353,594 B1 | 3/2002 | Tooker et al. |
| 6,427,173 B1 * | 7/2002 | Boucher et al. ........... 709/238 |
| 6,807,169 B2 * | 10/2004 | Mattathil .................... 370/352 |
| 7,124,205 B2 * | 10/2006 | Craft et al. ................ 709/250 |
| 7,197,546 B1 | 3/2007 | Bagga et al. |
| 7,212,543 B1 | 5/2007 | Arwald et al. |
| 7,379,454 B2 * | 5/2008 | Ogasawara et al. ........ 370/389 |
| 2002/0097725 A1 | 7/2002 | Dighe et al. |
| 2002/0159456 A1 | 10/2002 | Foster et al. |
| 2004/0081203 A1 * | 4/2004 | Sodder et al. ............. 370/469 |
| 2004/0225490 A1 | 11/2004 | Douady et al. |
| 2004/0264503 A1 * | 12/2004 | Draves, Jr. ................ 370/469 |
| 2005/0022143 A1 * | 1/2005 | Butts et al. ................ 716/5 |
| 2005/0220143 A1 * | 10/2005 | DelRegno et al. .......... 370/471 |

(Continued)

FOREIGN PATENT DOCUMENTS

EP      1484897      12/2004

(Continued)

OTHER PUBLICATIONS

Di Crescenzo, "A Pragmatic Pproach to Evaluating NoC Strategies", http://www.edatechforum.com/journal/june2007/pragmatic.cfm, Jun. 2007, pp. 1-6, Publisher: Arteris.

(Continued)

*Primary Examiner*—Chi H Pham
*Assistant Examiner*—Robert Lopata
(74) *Attorney, Agent, or Firm*—Fogg & Powers LLC (57) ABSTRACT

A method of communicatively coupling network elements supporting multiple network protocol types comprises receiving input having multiple network protocol types from an upper-level of the protocol stack at an endpoint-flexible-interface layer in a network endpoint, mapping the input between the upper-level of a protocol stack and a common-lower-level in the protocol stack at the endpoint-flexible-interface layer, and implementing the common-lower-level protocol layer to interface the multiple network protocol types to the physical layer, so that at least two endpoints of a network are communicatively coupled.

20 Claims, 8 Drawing Sheets

U.S. PATENT DOCUMENTS

| | | |
|---|---|---|
| 2006/0153070 A1* | 7/2006 | DelRegno et al. ........... 370/229 |
| 2006/0203747 A1 | 9/2006 | Wright et al. |
| 2006/0206218 A1 | 9/2006 | Glanzer et al. |
| 2007/0136495 A1* | 6/2007 | Boucher et al. ............. 709/250 |

FOREIGN PATENT DOCUMENTS

| | | |
|---|---|---|
| EP | 1484897 A1 * | 12/2004 |
| EP | 1494408 | 1/2005 |
| WO | 0143456 | 6/2001 |

OTHER PUBLICATIONS

European Patent Office, "European Search Report", Jul. 15, 2009, Published in: EP.

Hogie, Keith et al., "Using Standard Internet Protocols and Application in Space", "Computer Networks", Sep. 16, 2004, pp. 603-650, No. 47, Publisher: Elsevier B.V., Published in: Lanham-Seabrook, MD.

* cited by examiner

COMMON PROTOCOL AND ROUTING SCHEME FOR SPACE DATA PROCESSING NETWORKS

CROSS REFERENCE TO RELATED APPLICATIONS

This application is related to U.S. patent application Ser. No. 11/838,023, having a title of "VIRTUAL NETWORK ARCHITECTURE FOR SPACE DATA PROCESSING" (also referred to here as the "'023 application").

BACKGROUND

Currently, as new data processing architectures are developed for space applications, each data processing architecture is highly specialized and often relies upon a separate system interconnect technology. Since each customer has different system-level performance requirements, each system interconnect design starts from scratch. There is high risk associated with adopting new technology for each and every mission, and network technology is vulnerable to obsolescence since support for a given protocol may die out, leaving no path to higher performance as technology scales. Furthermore, only one protocol type may run over each physical network fabric, implying that complex space systems often require separate physical networks for separate functions such as data traffic, control, and management. The requirement of separate physical networks for each function further increases system complexity, size, weight, and power.

SUMMARY

In a first aspect, a method of communicatively coupling network elements supporting multiple network protocol types comprises receiving input having multiple network protocol types from an upper-level of the protocol stack at an endpoint-flexible-interface layer in a network endpoint, mapping the input between the upper-level of a protocol stack and a common-lower-level in the protocol stack at the endpoint-flexible-interface layer, and implementing the common-lower-level protocol layer to interface the multiple network protocol types to the physical layer, so that at least two endpoints of a network are communicatively coupled.

DRAWINGS

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
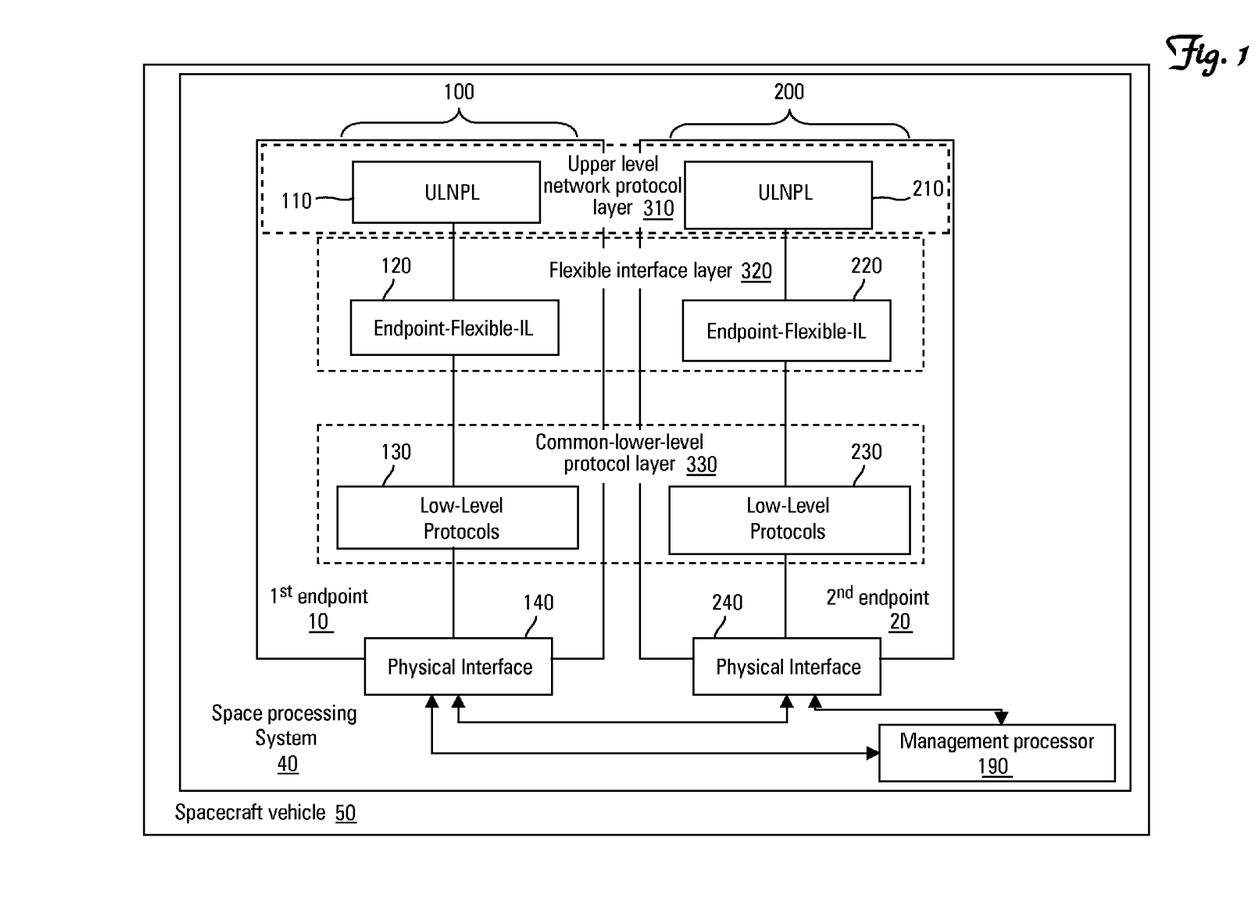
FIG. 1 is a block diagram of one embodiment of protocol stacks in communicatively coupled network endpoints in accordance with the present invention.

FIG. 1 is a block diagram of one embodiment of protocol stacks 100 and 200 in respective communicatively coupled network endpoints 10 and 20 in accordance with the present invention. The network endpoints 10 and 20 are also referred to herein as "endpoints 10 and 20." A data processing architecture for space applications is shown in a space processing system 40 housed in a spacecraft vehicle 50. The space processing system 40 is referred to herein as "network 40." The space processing system 40 includes a plurality of network elements 10 and 20, also referred to herein as "first endpoint 10 and second endpoint 20." The first endpoint 10 and second endpoint 20 are communicatively coupled to each other via the respective physical interfaces 140 and 240 of the physical layer. The physical interfaces 140 and 240 comprise a plurality of physical interconnections for receiving and/or transmitting inputs having a respective plurality of protocols. As defined herein, the terms "input" and "inputs" are used to represent datum, data, signals, and/or information indicative of data and/or signals that are received at layers of the protocol stacks and that are sent from the layers of the protocol stack. Thus, the term input, generically represents input signals and output signals.

A management processor 190 manages the network elements 10 and 20 in the space processing system 40. The management processor 190 is communicatively coupled to the first endpoint 10 and the second endpoint 20 via the respective physical interfaces 140 and 240 in order to manage them. In one implementation of this embodiment, the management processor 190 is one of the endpoints in the space processing system 40.

The protocol stacks 100 and 200 in the respective network endpoints 10 and 20 each include a plurality of lower-level interconnect protocols 330 (also referred to herein as "common-lower-level protocol layer 330"), a plurality of upper-level network protocols 310 (also referred to herein as upper-level 310 of a network protocol stack), and a flexible interface layer 320 that lies between the plurality of lower-level interconnect protocols and the plurality of upper-level network protocols. Each upper-level network protocol is associated with a respective type of data traffic. As shown in FIG. 1, the protocol stack 100 of the first endpoint 10 includes the upper-level network protocol layer (ULNPL) 110, such as an application layer, in the upper-level 310 of the network protocol stack 100, the endpoint-flexible-interface layer (Endpoint-Flexible IL) 120 in the flexible interface layer 320, and the low-level protocol 130 in the common-lower-level protocol layer 330. Likewise, the protocol stack 200 of the second endpoint 20 includes the upper-level network protocol layer 210 in the upper-level 310 of the network protocol stack 200, the endpoint-flexible-interface layer 220 in the flexible interface layer 320, and the low-level protocol 230 in the common-lower-level protocol layer 330. In one implementation of this embodiment, the low-level protocol 130 is a low-level serial protocol 130.

The lower-level interconnect protocols, such as low-level protocols 130 and 230, are common to each of the plurality of network elements in the space processing system 40. Thus, the low-level protocols 130 and 230 include the same protocols. The common-lower-level protocol layer 330 provides the platform on which the plurality of upper-level network protocols co-exist.

The flexible interface layer maps the plurality of upper level protocols in the flexible interface layer 320 to an associated one of the plurality of lower-level interconnect protocols in the common-lower-level protocol layer 330 of a network element, such as first and second endpoints 10 and 20. The lower-level protocols are independent of the physical transport medium and the upper-layer protocols. In one implementation of this embodiment, as shown in FIG. 1, all the network elements are network endpoints. In one implementation of this embodiment, the network elements in the space processing system 40 comprise a tightly coupled embedded system. In another implementation of this embodiment, the network elements are in a processing system that is not a space processing system in a spacecraft vehicle 50. In yet another implementation of this embodiment, the network elements comprise a tightly coupled embedded system that is not a space processing system.

Figure 2A:
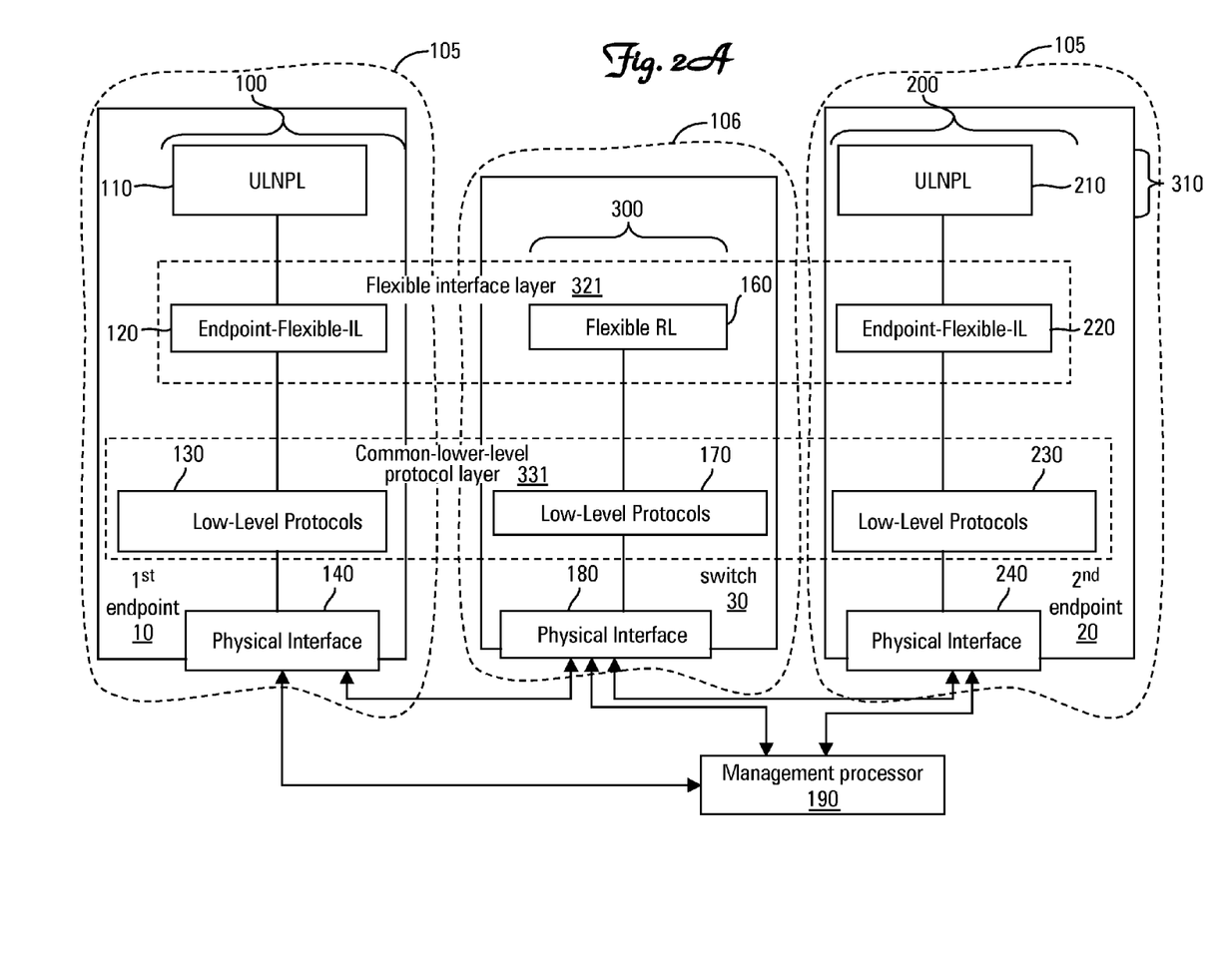
FIGS. 2A and 2B are block diagrams of embodiments of protocol stacks communicatively coupling endpoints and switches in accordance with the present invention.
Figure 2B:
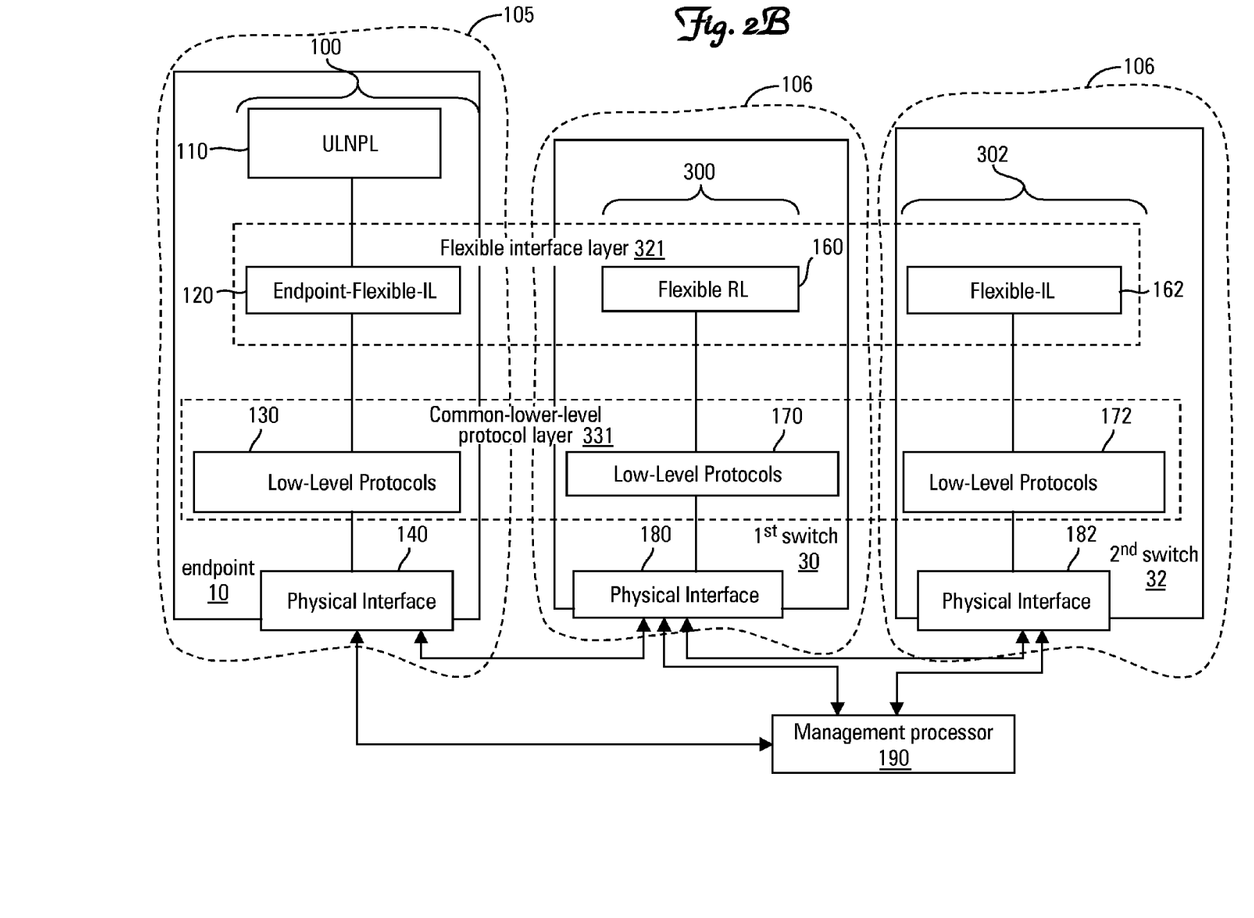

FIGS. 2A and 2B are block diagrams of embodiments of protocol stacks communicatively coupling endpoints and switches in accordance with the present invention. FIG. 2A is a block diagram of one embodiment of protocol stacks 100 and 200 in respective network endpoints 10 and 20 communicatively coupled via a protocol stack 300 in a switch 30 in accordance with the present invention. A first portion of the network elements represented generally by the numeral 105 include network endpoints, such as network endpoints 10 and 20, which each have an endpoint-flexible-interface layer 120 and 220, respectively, in the flexible interface layer 321. A second portion of the network elements represented generally by the numeral 106 includes switches, such as switch 30. Each switch 30 has a flexible-routing layer (Flexible RL) 160 in the flexible interface layer 321. In one implementation of this embodiment, the network elements 10 and 20 and the switch 30 are in a space processing system in a spacecraft vehicle 50.

The management processor 190 manages the network elements, such as network endpoints 10 and 20 and the switch 30. The management processor 190 is communicatively coupled to the physical interfaces 140, 180, and 240 of the first endpoint 10, the switch 30, and the second endpoint 20 in order to manage them. In one implementation of this embodiment, the management processor 190 is communicatively coupled to the physical interface 180 of the switch 30, and the management processor 190 indirectly manages the first endpoint 10 and the second endpoint 20 via the switch 30.

As shown in FIG. 2A, the protocol stack 300 of the switch 30 includes the flexible routing layer 160 in the flexible interface layer 321 and the low-level protocol 170 in the common-lower-level protocol layer 331. The protocol stacks 100 and 200 in the respective network endpoints 10 and 20 are as described above with reference to FIG. 1. The protocol stacks 100 and 200 of the respective first endpoint 10 and second endpoint 20 include the endpoint-flexible-interface layers 120 and 220 in the flexible interface layer 321 and the low-level protocol 130 and 230 in the common-lower-level protocol layer 331.

The low-level protocols 130 and 230 have at least one protocol in common with the low-level protocols 170 in the switch 30, however low-level protocols 130 and 230 do not need to have any protocols in common with each other. The common-lower-level protocol layer 331 provides the platform on which the plurality of upper-level network protocols co-exist. In one implementation of this embodiment, a single standard lower-level protocol is run on the common-lower-level protocol layer of each protocol stack when the system is powered-on.

The flexible routing layer 160 in the switch 30 routes the input from the first endpoint 10 to the second endpoint 20. The flexible routing layer 160 in the switch 30 maps the received input to the second endpoint and, based on the mapping, the switch 30 sends the input via the physical interface 180. The physical interface 180 comprises at least one physical interconnection for receiving and/or transmitting inputs in a respective plurality of protocols. In one implementation of this embodiment, the same physical interconnection is used for multiple upper-level protocols. In another implementation of this embodiment, the same physical interconnections are also used for some lower-level protocols. In yet another implementation of this embodiment, some lower-level protocols use different physical interconnections from the other lower-level protocols.

FIG. 2B is a block diagram of one embodiment of protocol stack 100 in respective network endpoint 10 communicatively coupled to a second switch 32 via a protocol stack 300 in a first switch 30 in accordance with the present invention. FIG. 2B differs from FIG. 2A in that the endpoint 10 is communicatively coupled to a second switch 32 via the switch 30, also referred to as first switch 30. The second switch 32 is similar in structure to the first switch 30 described above with reference to FIG. 2A. The low-level protocol 172 in the common-lower-level protocol layer 331 of the second switch 32 is similar to the low-level protocol 170 in the common-lower-level protocol layer 331 of the first switch 30. Likewise, the flexible-routing layer 162 in the second switch 32 is similar to the flexible-routing layer 160 in the first switch 30. In one implementation of this embodiment, the input sent to the second switch 32 is sent to yet another network element, such as a third switch or a second endpoint. In another implementation of this embodiment, the input sent to the second switch 32 is stored or implemented at the second switch 32 and is not sent to any other network element.

The management processor 190 manages the network elements, such as network endpoint 10 and the switches 30 and 32. The management processor 190 is communicatively coupled to the physical interfaces 140, 180, and 182 of the respective endpoint 10, the first switch 30, and the second switch 32 in order to directly manage the endpoint 10, the first switch 30, and the second switch 32. In one implementation of this embodiment, the management processor 190 is communicatively coupled to the physical interface 180 of the first switch 30, and the management processor 190 indirectly manages the endpoint 10 and the second switch 32 via the first switch 30. In one implementation of this embodiment, two switches are communicatively coupled to each other via a third switch.

Figure 3:
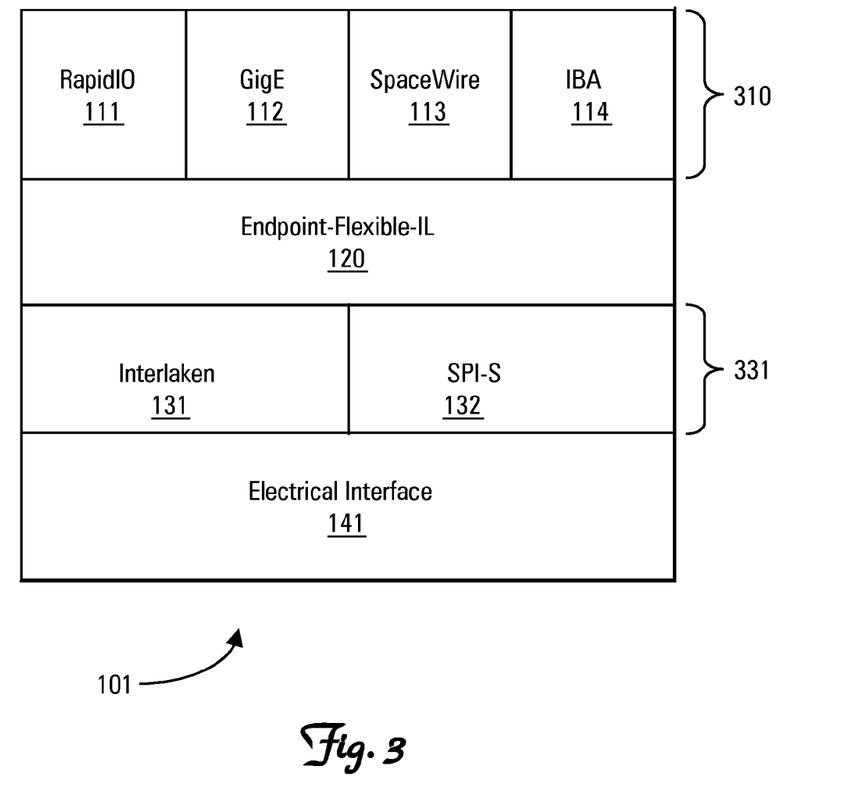
FIG. 3 is a block diagram of one embodiment of an endpoint protocol stack in accordance with the present invention.

FIG. 3 is a block diagram of one embodiment of an endpoint protocol stack 101 in accordance with the present invention. The physical interface is an electrical interface 141. The upper level 310 of the protocol stack includes applications using commercially available network protocols RapidIO 111, Gigibit Ethernet (GigE) 112, SpaceWire 113, and InfiniBand Architecture (IBA) 114. The common-lower-level protocol layer 331 of FIG. 3 includes commercially available protocols including Interlaken 131 and System Packet Interface-Scalable (SPI-S) 132.

Figure 4:
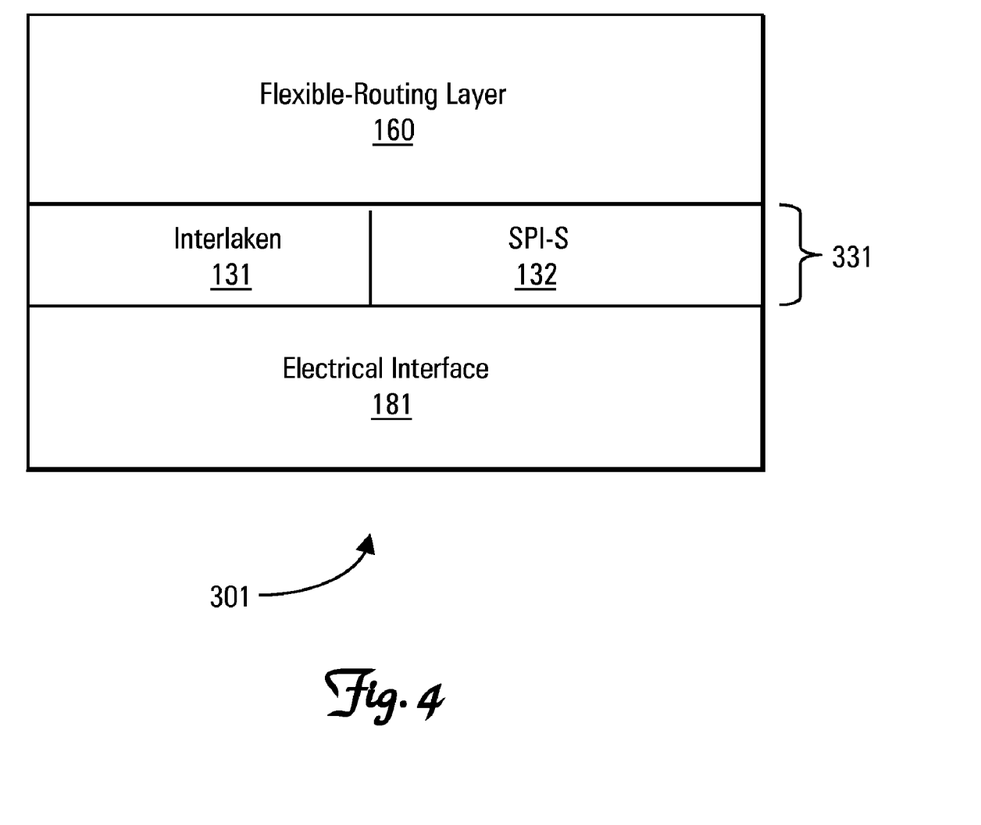
FIG. 4 is a block diagram of one embodiment of a switch protocol stack in accordance with the present invention.

FIG. 4 is a block diagram of one embodiment of a switch protocol stack 301 in accordance with the present invention. The physical interface is an electrical interface 181. There is no level of the switch protocol stack 301 above the flexible-routing layer 160. The common-lower-level protocol layer 331 of FIG. 3 includes commercially available protocols including Interlaken 131 and SPI-S 132 so the switch protocol stack 301 is compatible with the endpoint protocol stack 101 as shown in FIG. 3.

Figure 5:
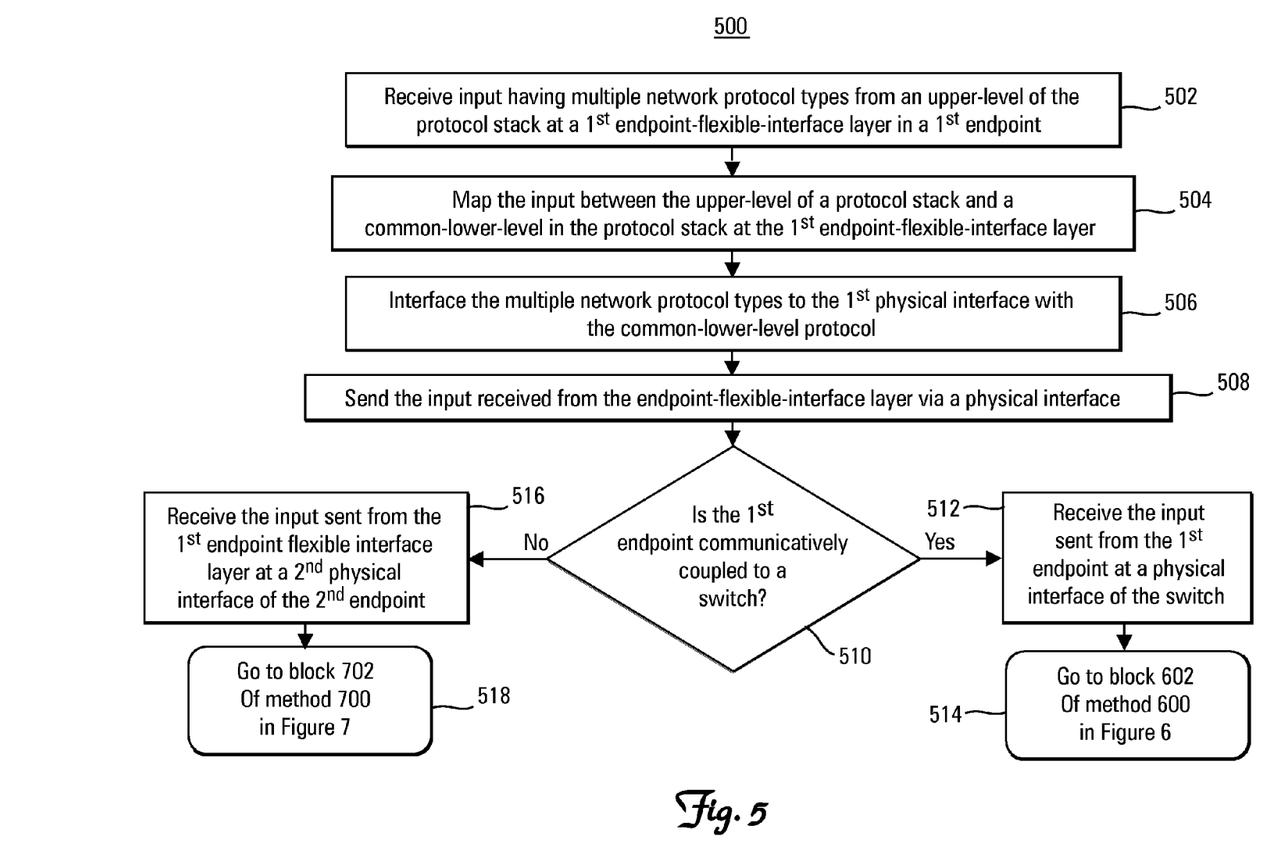
FIG. 5 is a flow diagram of one embodiment of a method to communicatively couple network elements supporting multiple network protocol types.

FIG. 5 is a flow diagram of one embodiment of a method 500 to communicatively couple network elements supporting multiple network protocol types. The method 500 is described with reference to the exemplary protocol stacks 100, 200, and 300 of FIGS. 1 and 2 although it is to be understood that method 500 can be implemented using other embodiments of the communicatively coupled protocol stacks as is understandable by one skilled in the art who reads this document.

At block 502, a network endpoint receives input having multiple network protocol types from an upper-level of the protocol stack at an endpoint-flexible-interface layer in the network endpoint. As defined herein, input having multiple network protocol types includes one or more inputs having multiple network protocol types. In one implementation of this embodiment, an endpoint-flexible-interface layer 120 in the network endpoint 10 receives input having multiple network protocol types from an upper-level network protocol layer 110 of the protocol stack 100. In an exemplary case, the network endpoint 10 receives input from applications that support RapidIO 111, Gigibit Ethernet (GigE) 112, SpaceWire 113, and InfiniBand Architecture (IBA) 114 (FIG. 3).

At block 504, the endpoint-flexible-interface layer in the network endpoint maps the input between the upper-level of the protocol stack and a common-lower-level in the protocol stack. In one implementation of this embodiment, the endpoint-flexible-interface layer 120 in the first network endpoint 10 maps the input between the upper-level 310 of the protocol stack 100 and a common-lower-level 331 (FIG. 2A) in the protocol stack 100. At block 506, the multiple network protocol types are interfaced to the physical interface in the physical layer with the common-lower-level protocol layer so that at least two endpoints of the network are communicatively coupled. In one implementation of this embodiment, the common-lower-level protocol layer 331 is implemented to interface the multiple network protocol types to the physical interface 140 of the first network endpoint 10 so that the first network endpoint 10 is communicatively coupled to the second network endpoint 20. At block 508, the input received from the endpoint-flexible-interface layer is sent from the network element via the first physical interface. In one implementation of this embodiment, the input received from the endpoint-flexible-interface layer 120 is sent from the first network element 10 via the physical interface 140. In one implementation of this embodiment, the management processor 190 of FIG. 1 or 2 sends instructions to communicatively couple the first endpoint 10 to the second endpoint 20.

At block 510, it is determined if the first endpoint 10 is communicatively coupled to a switch. In one implementation of this embodiment, the management processor 190 knows if the network endpoint is communicatively coupled to a switch. If the network endpoint is communicatively coupled to a switch, the flow proceeds to block 512. At block 512, the input sent from the first endpoint is received at the physical interface of the switch in the physical layer. In one implementation of this embodiment, the input sent from the first endpoint 100 is received at the physical interface 180 of the switch 30 (FIG. 2A). At block 514, the flow of method 500 is directed to block 602 of method 600 in FIG. 6.

If the network endpoint is not communicatively coupled to a switch, it is communicatively coupled directly to another network endpoint. In this case, the flow proceeds to block 516 from block 510. At block 516, the input sent from the first endpoint flexible interface layer is received at a second physical interface in the physical layer of the second endpoint. In one implementation of this embodiment, the input sent from the first endpoint flexible interface layer 120 via the physical interface 140 is received at a second physical interface 240 of the second endpoint 20 (FIG. 1). At block 518, the flow of method 500 is directed to block 702 of method 700 in FIG. 7. In one implementation of this embodiment, the protocol stack in the switch is the protocol stack shown in FIG. 4.

Figure 6:
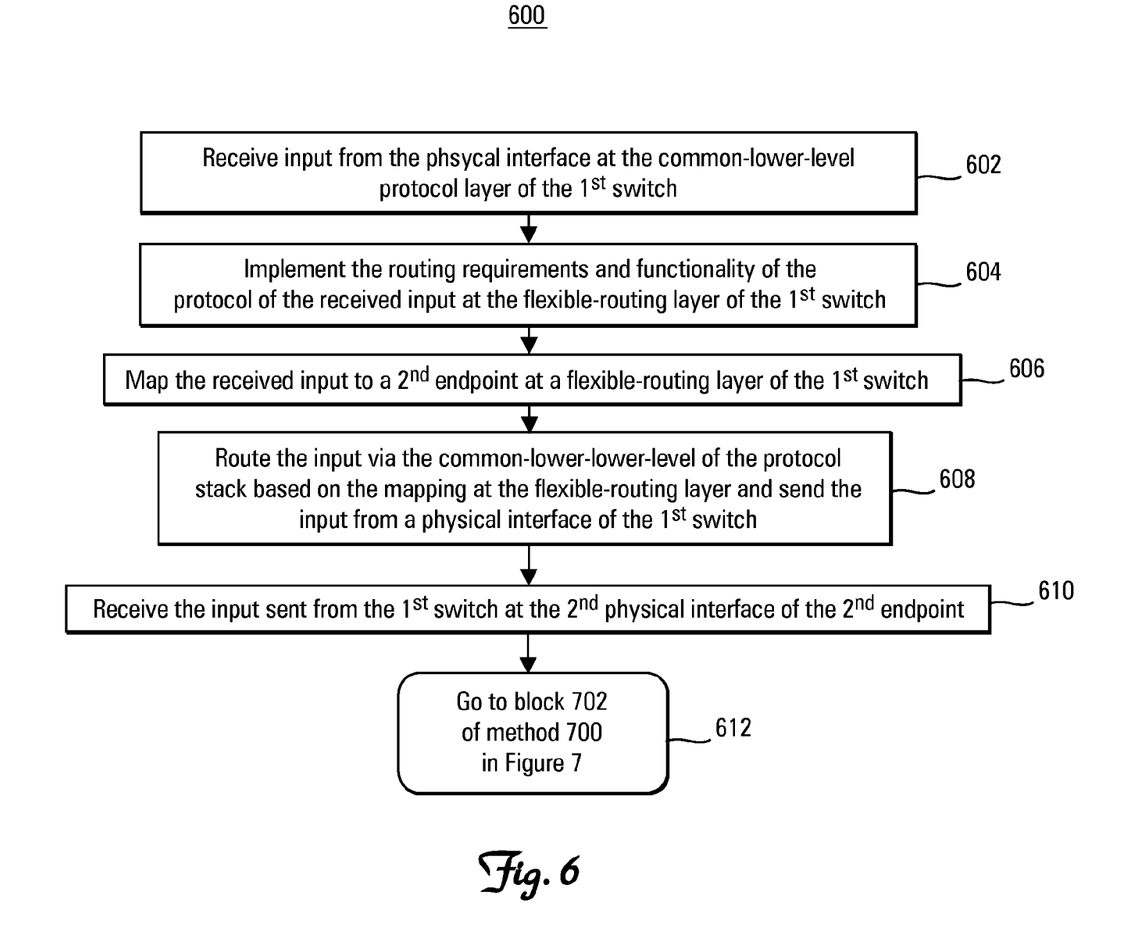
FIG. 6 is a flow diagram of one embodiment of a method to implement a common-lower-level protocol layer in a switch protocol stack in accordance with the present invention.

FIG. 6 is a flow diagram of one embodiment of a method 600 to implement a common-lower-level protocol layer in a switch protocol stack in accordance with the present invention. Method 600 is implemented when the first endpoint is communicatively coupled to the switch and after input is received at the switch from the first endpoint. The method 600 is described with reference to the exemplary protocol stacks 100, 200, and 300 of FIG. 2A, although it is to be understood that method 600 can be implemented using other embodiments of the communicatively coupled network endpoints and switches as is understandable by one skilled in the art who reads this document.

At block 602, the switch receives input from the physical interface at the common-lower-level protocol layer. In one implementation of this embodiment, the switch 30 (also referred to herein as first switch 30) receives input from the physical interface 180 at the low-level protocol 170 of the common-lower-level protocol layer 331.

At block 604, the switch implements the routing requirements and functionality of the protocol of the received input at the flexible routing layer. In one implementation of this embodiment, the first switch 30 implements the routing requirements and functionality of the protocol of the received input at the flexible routing layer 160.

At block 606, the switch maps the received input to another network element, such as a second endpoint or a second switch, at a flexible-routing layer of the switch. In one implementation of this embodiment, the first switch 30 maps the received input to a second endpoint 20 at a flexible-routing layer 160 of the flexible interface layer 321. In another implementation of this embodiment, the first switch 30 maps the received input to a second switch 32 at a flexible-routing layer 160 of the flexible interface layer 321.

At block 608, the switch routes the input via the lower-level of the protocol stack based on the mapping at the flexible-routing layer by sending the input from a physical interface of the switch. In one implementation of this embodiment, the first switch 30 routes the input via the low-level protocol 170 in the common-lower-level protocol layer 331 based on the mapping at the flexible-routing layer 160 and sends the input from a physical interface 180 of the first switch 30. In one implementation of this embodiment, the input is routed to the second endpoint 20. In another implementation of this embodiment, the input is routed to the second switch 32. It is to be appreciated that the switch can route input received from the second endpoint 20 (or the second switch 32 as shown in FIG. 2B) to the first endpoint 10, since communication between the network elements is bidirectional. Thus, in other embodiments, the functionality of the first endpoint and the second endpoint are switched.

At block 610, the second endpoint receives the input sent from the switch at a second physical interface. In one implementation of this embodiment, the second endpoint 20 receives the input sent from the first switch 30 at a second physical interface 240. At block 612, the flow proceeds to block 702 of method 700 in FIG. 7.

Figure 7:
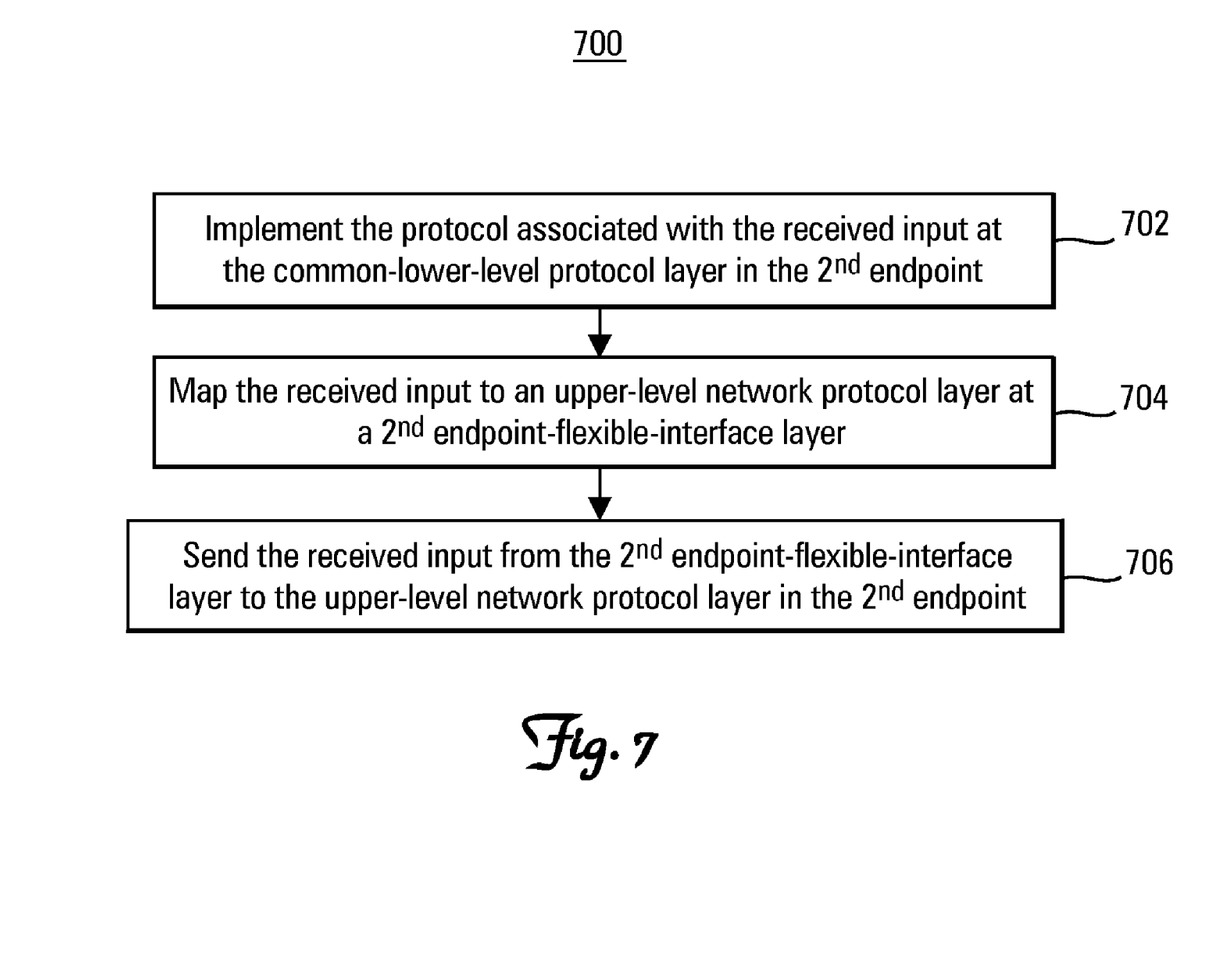
FIG. 7 is a flow diagram of one embodiment of a method to implement a common-lower-level protocol layer in an endpoint protocol stack in accordance with the present invention.

FIG. 7 is a flow diagram of one embodiment of a method 700 to implement a common-lower-level protocol layer 331 in an endpoint protocol stack 200 accordance with the present invention. Method 700 is implemented when input is received at the second endpoint from either a communicatively coupled first endpoint or a communicatively coupled switch in a system, such as space processing system 40 (FIG. 1). The method 700 is described with reference to the exemplary protocol stacks 100, 200, and 300 of FIGS. 1 and 2A although it is to be understood that method 700 can be implemented using other embodiments of the communicatively coupled protocol stacks as is understandable by one skilled in the art who reads this document.

At block 702, the second endpoint implements the protocol associated with the received input at the common-lower-level protocol. The second endpoint has received the input either directly from the first endpoint (see block 516 of method 500 in FIG. 5) or indirectly from the first endpoint via the switch (see block 610 of method 600 in FIG. 6). In one implementation of this embodiment, the second endpoint 20 implements the protocol associated with the received input at the low-level protocol 230 of the common-lower-level protocol 331. At block 704, the second endpoint maps the received input to an upper-level network protocol layer at a second endpoint-flexible-interface layer. In one implementation of this embodiment, the second endpoint-flexible-interface layer 220 in the second endpoint 20 maps the received input to an upper-level network protocol layer 210. Based on the mapping at the second endpoint-flexible-interface layer, at block 706, the second endpoint sends the received input from the second endpoint-flexible-interface layer to the upper-level network protocol layer in the second endpoint. In one implementation of this embodiment, the second endpoint 20 sends the received input from the second endpoint-flexible-interface layer 220 to the upper-level network protocol layer 210 in the second endpoint 20. In one implementation of this embodiment, the protocol stack in the second endpoint is the protocol stack shown in FIG. 3.

An implementation of methods 500, 600 and/or 700 provides a method of sending and/or receiving a mixture of upper-level protocol types from at least one endpoint in the network. Additionally, an implementation of methods 500, 600 and/or 700 provides a method of sending and/or receiving a mixture of upper-level protocol types from at least one switch in the network. As defined herein a "sending and/or receiving a mixture of upper-level protocol types" includes sending and/or receiving different types of upper-level protocols in a relatively short time frame. For example, a network element in an exemplary network having the architecture described in this document can send data in RapidIO format followed by data in SpaceWire format, followed by data in Gigibit Ethernet format, followed by data in SpaceWire format. Effectively, multiple protocol types can run nearly simultaneously over the flexible network using a single interconnect for sending and receiving data, control signals and management signals.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of communicatively coupling network elements supporting multiple network protocol types, the method comprising:

receiving input having multiple network protocol types from an upper-level of a protocol stack at an endpoint-flexible-interface layer in a network endpoint;

mapping the input between the upper-level of the protocol stack and a common-lower-level in the protocol stack at the endpoint-flexible-interface layer; and interfacing the multiple network protocol types to the physical layer with the common-lower-level protocol, wherein at least two endpoints of a network are communicatively coupled, the communicative coupling being managed by a management processor communicatively coupled to the at least two endpoints.

2. The method of claim 1, wherein interfacing the multiple network protocol types to the physical layer comprises:

sending the input received from the endpoint-flexible-interface layer via a physical interface, wherein the sending is based on the mapping of the input between the upper-level and the common-lower-level.

3. The method of claim 2, wherein the endpoint is a first endpoint comprising a first endpoint-flexible-interface layer and a first physical interface, the method further comprising:

receiving the input sent from the first endpoint at a second physical interface of a second endpoint;

implementing the protocol associated with the input received from the first endpoint at the common-lower-level protocol layer; and mapping the received input to an upper-level network protocol layer at a second endpoint-flexible-interface layer.

4. The method of claim 3, further comprising:

sending the received input from the second endpoint-flexible-interface layer to the upper-level network protocol layer in the second endpoint based on the mapping at the second endpoint-flexible-interface layer.

5. The method of claim 2, wherein the endpoint is a first endpoint comprising a first endpoint-flexible-interface layer and a first physical interface, the method further comprising:

receiving the input sent from the first endpoint at a physical interface of a switch;

receiving input from the physical interface at the common-lower-level protocol layer of the switch;

implementing the routing requirements and functionality of the protocol of the received input at the flexible routing layer;

mapping the received input to a second endpoint at a flexible-routing layer of the switch; and routing the input via the common-lower-level protocol layer of the protocol stack based on the mapping at the flexible-routing layer.

6. The method of claim 5, wherein routing the input via the common-lower-level protocol layer of the protocol stack comprises sending the input from a physical interface of the switch, the method further comprising:

receiving the input sent from the switch at a second physical interface of the second endpoint;

implementing the protocol associated with the input received from the first endpoint via the switch at the common-lower-level protocol layer; and mapping the received input to an upper-level network protocol layer at a second endpoint-flexible-interface layer.

7. The method of claim 6, further comprising:
sending the received input from the second endpoint-flexible-interface layer to the upper-level network protocol layer in the second endpoint based on the mapping at the second endpoint-flexible-interface layer.

8. The method of claim 1, wherein the endpoint is a first endpoint, and the endpoint-flexible-interface layer is a first endpoint-flexible-interface layer, the method further comprising:
sending the input received from the first endpoint-flexible-interface layer via a physical interface, wherein the sending is based on the mapping;
routing the input from the first endpoint to one of a second endpoint and a second switch via a first switch, wherein the routing is implemented by a mapping of the input at a flexible layer in each of the first endpoint and the first switch.

9. The method of claim 8, wherein routing the input from the first endpoint to one of the second endpoint and the second switch via the first switch comprises:
receiving the input sent from the first endpoint at a physical interface of the first switch;
receiving input from the physical interface at the common-lower-level protocol layer of the first switch;
implementing the routing requirements and functionality of the protocol of the received input at the flexible-routing layer of the first switch;
mapping the received input to the one of the second endpoint and the second switch at a flexible-routing layer of the first switch;
sending the input from a physical interface of the first switch based on the mapping at the flexible-routing layer of the first switch;
receiving the input sent from the first switch at a second physical interface of the one of the second endpoint and the second switch;
implementing the protocol associated with the input received from the one of the second endpoint and the second switch via the first switch at the common-lower-level protocol layer; and
mapping the received input to an upper-level network protocol layer at one of a second endpoint-flexible-interface layer in the second endpoint or a flexible-routing layer in the second switch.

10. The method of claim 8, further comprising sending a mixture of different upper-level protocol types from at least one endpoint in the network.

11. The method of claim 8, further comprising receiving a mixture of different upper-level protocol types from at least one endpoint in the network.

12. The method of claim 8, further comprising sending and receiving a mixture of different upper-level protocol types from at least one endpoint in the network.

13. The method of claim 8, further comprising sending a mixture of different upper-level protocol types from at least one switch in the network.

14. The method of claim 8, further comprising sending and receiving a mixture of different upper-level protocol types from at least one switch in the network.

15. A flexible network architecture, comprising:
a plurality of network elements being communicatively coupled to and managed by a management processor, each network element comprising:
a plurality of upper-level network protocols, each protocol associated with a type of data traffic;
a protocol stack comprising:
at least one lower-level interconnect protocol common to each of the plurality of network elements, the lower-level interconnect protocol providing a platform on which a plurality of upper-level network protocols co-exist; and
the plurality of upper-level network protocols; and
a flexible interface layer between the at least one lower-level interconnect protocol and the plurality of upper-level network protocols, the flexible interface layer configured to map the plurality of upper level protocols to an associated one of the at least one lower-level interconnect protocol, wherein the at least one lower-level protocol is independent of the physical transport medium and the upper-layer protocols.

16. The flexible network architecture of claim 15, wherein all the network elements are network endpoints, wherein the flexible interface layer is an endpoint-flexible-interface layer.

17. The flexible network architecture of claim 15, wherein a first portion of the network elements are network endpoints, having an endpoint-flexible-interface layer for the flexible interface layer and a second portion of the network elements are switches having a flexible-routing layer for the flexible interface layer.

18. A data processing architecture for space applications, comprising:
a plurality of network elements forming a space processing system, the plurality of network elements housed in a spacecraft vehicle,
each network element comprising:
a plurality of upper-level network protocols, each protocol associated with a type of data traffic;
a protocol stack comprising:
at least one lower-level interconnect protocol common to each of the plurality of network elements, the lower-level interconnect protocol providing a platform on which the plurality of upper-level network protocols co-exist; and
a plurality of upper-level network protocols; and
a flexible interface layer between the plurality of lower-level interconnect protocols and the plurality of upper-level network protocols, the flexible interface layer configured to map the plurality of upper level protocols to an associated one of the plurality of lower-level interconnect protocols, wherein the lower-level protocols are independent of the physical transport medium and the upper-layer protocols; and
a management processor to manage the plurality of network elements.

19. The flexible network architecture of claim 18, wherein all the network elements are network endpoints, wherein the flexible interface layer is an endpoint-flexible-interface layer.

20. The flexible network architecture of claim 18, wherein a first portion of the network elements are network endpoints, having an endpoint-flexible-interface layer for the flexible interface layer and a second portion of the network elements are switches having a flexible-routing layer for the flexible interface layer.

* * * * *